Oct. 3, 1961  P. J. HOLMES  3,002,391
PLURAL AXIS TRANSDUCER
Filed Aug. 7, 1957  2 Sheets-Sheet 1

Inventor:
Paul J. Holmes
By:
Keith J. Bleuer Atty.

Oct. 3, 1961 P. J. HOLMES 3,002,391
PLURAL AXIS TRANSDUCER
Filed Aug. 7, 1957 2 Sheets-Sheet 2

Inventor:
Paul J. Holmes
By:
Keith J. Bleuer Atty.

United States Patent Office 3,002,391
Patented Oct. 3, 1961

3,002,391
PLURAL AXIS TRANSDUCER
Paul J. Holmes, Laguna Beach, Calif., assignor to Borg-Warner Corporation, Chicago, Ill., a corporation of Illinois
Filed Aug. 7, 1957, Ser. No. 676,824
9 Claims. (Cl. 73—517)

This invention relates to vibrating string transducer devices for translating forces into electrical effects, and more particularly the invention relates to accelerometers of this type. Still more particularly, the invention relates to such transducer devices adapted for simultaneously measuring forces on axes which are at angles to each other.

Vibrating string transducers have heretofore been proposed using a string or wire kept under a variable tension by the force that is being measured. In the case of accelerometers, the force on the wire is due to the reaction of a mass to an unbalanced force which produces an acceleration of the mass, the mass being fixed on one end of the wire so as to cause an increase and a decrease in wire tension. Inasmuch as the frequency of vibration of the wire varies as the square root of its tension, it is possible to calibrate the frequency at which the wire vibrates in terms of the unbalanced force to which the mass is subjected and hence to the acceleration of the mass. The wire is disposed in a magnetic field and generates an alternating voltage of the same frequency as the natural vibrating frequency of the wire. Any slight change in wire tension resulting from the unbalanced force producing the acceleration or other force on the end of the wire causes a measurable change in output frequency of the unit.

Such translating devices utilizing a single wire have certain objections, among which are the fact that changes in frequency of the output signal are not substantially linear as related to changes of the applied force, and the signal is also affected to some extent by incipient forces acting at right angles to the wire axis and to the applied force being measured. To overcome these objections, it has been proposed to utilize a pair of wires, instead of a single wire, with the pair of wires being disposed on a common axis and being connected by an element, such as a mass, the force on which it is desired to measure. As the force moves the element in one direction or the other along the axis of the pair of wires, the tension on one of the wires is increased while the tension on the other is decreased. The natural frequency of vibration of the one of the wires is thus increased while the frequency of the other is decreased. These wires may be maintained in vibration by any suitable means, such as by passing an alternating current through each of the wires, and the difference in the frequency of vibration of the two wires may be measured by any suitable mechanism such as by mixing alternating electrical signals generated by the two wires to produce the difference frequency. Such a plural wire transducer is disclosed in my co-pending application for "Dual String Force Transducer," Serial No. 660,009, filed May 17, 1957.

It is an object of the present invention to provide a plural axis transducer, particularly an accelerometer, which may be utilized for simultaneously measuring forces having components on a plurality of axes. Such a plural axis transducer, it is contemplated, may be one for measuring the force components on X and Y axes disposed at right angles to each other or on X, Y and Z axes, all of which are disposed at right angles to each other.

More particularly, it is an object of the present invention to provide a plural axis transducer having a pair of vibrating wires on each of the axes, used instead of a single wire, so as to obtain substantially linear signals corresponding to the applied force on each of the axes.

Still more particularly, it is an object of the present invention to provide an improved plural axis transducer comprising an element, such as a mass, centrally disposed within a transducer casing and held suspended therein by three pairs of wires, each of the pairs being disposed on axes perpendicular to the others, whereby the transducer may be utilized for measuring forces simultaneously on X and Y axes or simultaneously on X, Y and Z axes, mutually perpendicular to each other.

The invention consists of the novel constructions, arrangements and devices to be hereinafter described and claimed for carrying out the above stated objects and such other objects as will be apparent from the following description of a preferred form of the invention illustrated with reference to the accompanying drawings, in which:

Like characters of reference designate like parts in the several views.

Figure 1:
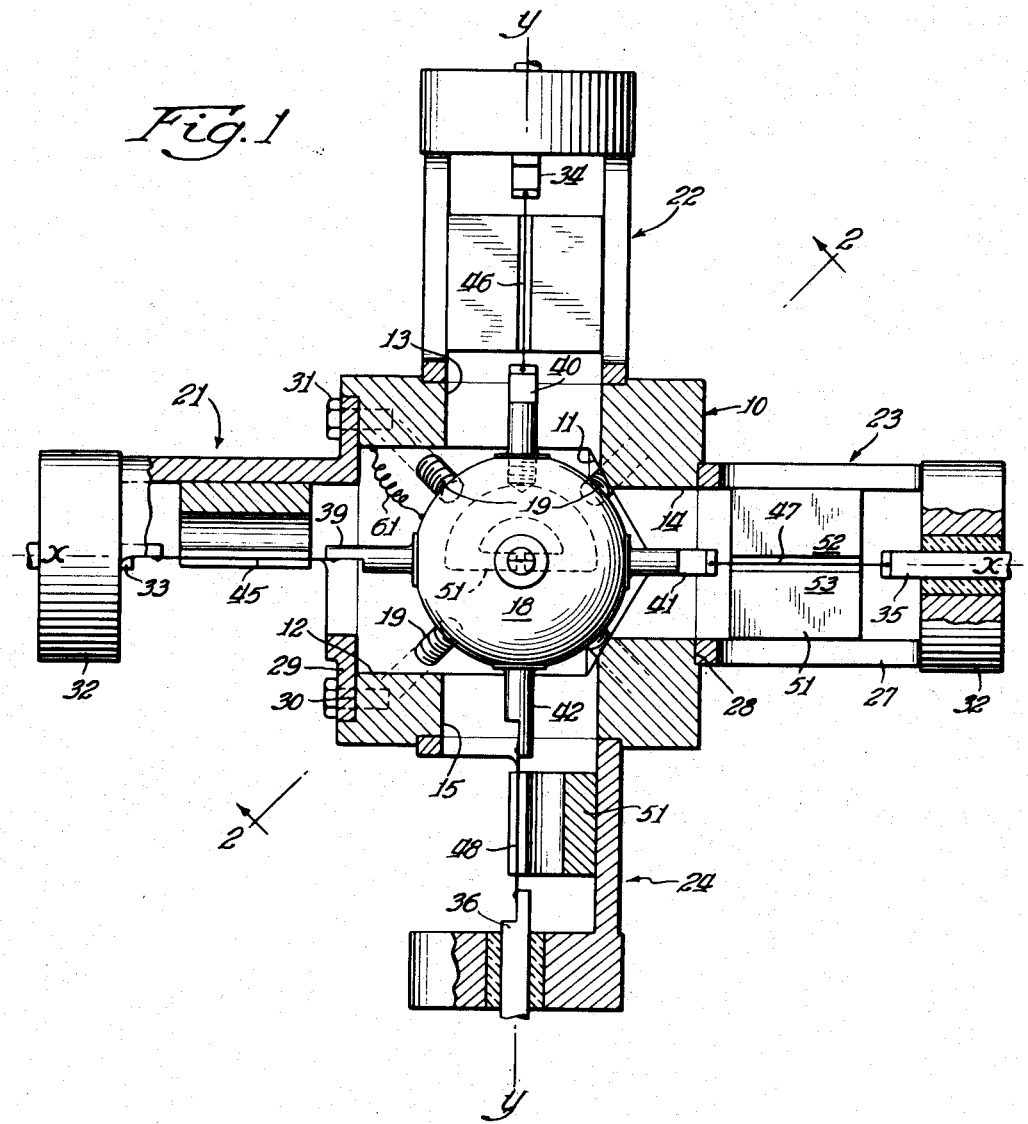
FIG. 1 is a sectional view of a vibrating wire accelerometer embodying the principles of the invention.
Figure 2:
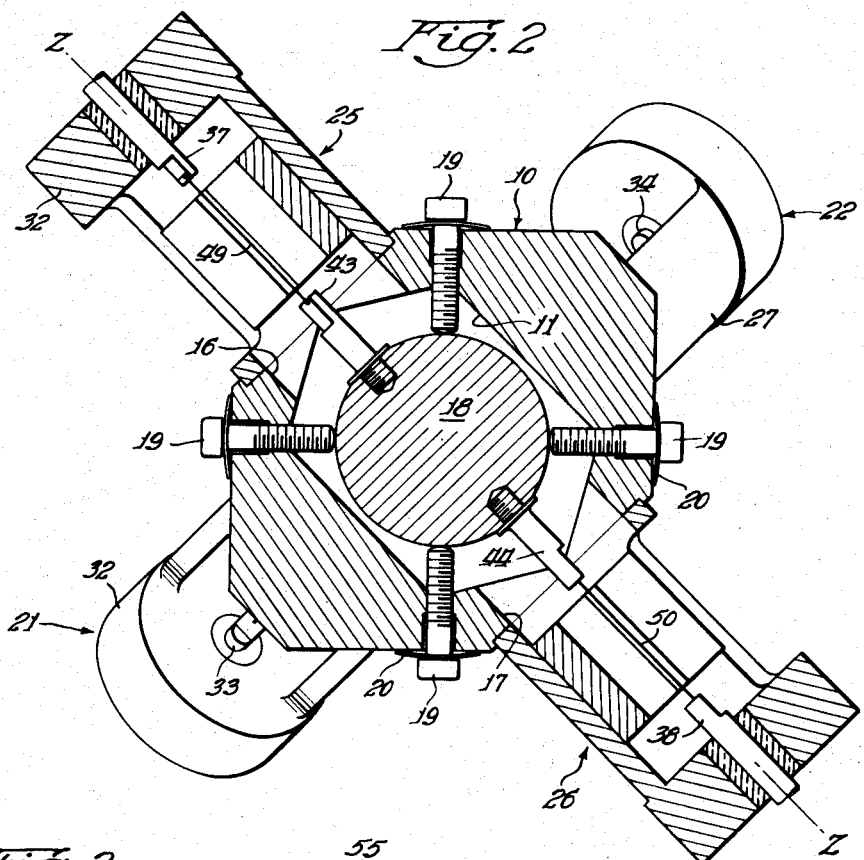
FIG. 2 is a sectional view taken on line 2—2 of FIG. 1.

Referring now to FIGS. 1 and 2, the illustrated accelerometer may be seen to comprise a central housing or casing 10 having a cavity 11 therein. Openings 12, 13, 14, 15, 16 and 17 are provided in the housing 10 connecting the cavity 11 with the exterior of the housing 10. The openings 13, 14 15, 16 and 17 have diameters somewhat less than that of the cavity 11, and the opening 12 is of the same diameter as the cavity 11 and constitutes in effect a continuation of the cavity 11.

A spherical mass 18 is loosely disposed in the cavity 11. Eight stops 19 extend through the housing 10 into close proximity to but not normally in contact with the mass 18, for limiting the movement that the mass 18 may have in the cavity 11. These stops are simply screws which are threaded into the housing 10, and each of them is provided with a lock washer 20 beneath its head of a suitable type for preventing undesired turning of the screw in the housing 10 once the screw has been adjusted. As will be observed, the stop screws 19 are positioned on axes that are perpendicular to each other.

Six wire retaining assemblies 21, 22, 23, 24, 25, and 26 are disposed on sides of the housing 10. As will be observed, the assemblies 21 and 23 are coaxially disposed with respect to each other on an X axis; the assemblies 22 and 24 are co-axially disposed with respect to each other on a Y axis which is at right angles to the X axis; and the assemblies 25 and 26 are co-axially disposed on a Z axis which is at right angles to both the X and Y axes.

Each of the assemblies 21, 22, 23, 24, 25 and 26 comprises a cylindrical shell 27. The shells 27 of the assemblies 22, 23, 24, 25, and 26 are positioned on countersunk shoulders 28 respectively surrounding the openings 13, 14, 15, 16 and 17. The shell 27 of the wire assembly 21 is provided with a peripheral flange 29 which is positioned on a countersunk shoulder 30 provided around the periphery of the opening 12 in the housing 10, and the assembly 21 is held in position by means of screws 31 extending through the flange 29 and threaded into the housing 10. Each of the assemblies 21, 22, 23, 24, 25, and 26 has a cap 32 fixed on its outer end, and terminal posts 33, 34, 35, 36, 37 and 38 extend through the caps of the assemblies 21, 22, 23, 24, 25 and 26, respectively, and are insulated from the caps.

Six terminal posts 39, 40, 41, 42, 43 and 44 are screw threaded into the mass 18. Thin vibratory wires or strings 45, 46, 47, 48, 49 and 50 are respectively fixed to and are stretched between the posts 33 and 39, the posts 34 and 40, the posts 35 and 41, the posts 36 and 42, the posts 37 and 43, and the posts 38 and 44. As will be apparent, the posts 33 and 39 and the string 45 therebetween, and the posts 41 and 35 and the string 47 therebetween are disposed on the X axis; the posts 34 and 40 and the string 46 therebetween, and the posts 42 and 36 and the string 48 therebetween, are disposed on the Y axis; and the posts 37 and 43 and the string 49 therebetween and the posts 44 and 38 and the string 50 therebetween are disposed on the Z axis; and each of these axes is perpendicular to each of the other two axes.

Each of the wire assemblies 21, 22, 23, 24, 25 and 26 includes a semi-circular C-shaped magnet 51 fixed within the shell 27 of the assembly which has north and south poles 52 and 53 disposed adjacent to the respective wires 45, 46, 47, 48, 49, and 50 on opposite sides of the wire, with the pole faces extending parallel to the wire. It will be observed that the magnets 51 of the assemblies 21 and 23 are rotated at 90 degrees with respect to each other; and the same is true of the magnets 51 in the assemblies 22 and 24 with respect to each other and of the magnets 51 of the assemblies 25 and 26 with respect to each other.

All of the wire retaining assemblies 21, 22, 23, 24, 25 and 26 are identical except that the assembly 21 is provided with the large diameter fastening flange 29 not provided on the others. This large diameter flange 29 permits the affixing of the assembly 21 to the housing 10 by the screws 31 around the periphery of the large diameter opening 12 in the housing 10 and the large diameter opening 12 permits the insertion into and the removal of the mass 18 with respect to the housing 10 prior to fixing the vibratory wires 45, 46, 47, 48, 49 and 50 with respect to the mass, since the opening 12 has the same diameter as the cavity 11. In the assembled condition of the transducer as shown in FIGS. 1 and 2, it will be apparent that the housing 10 and the assemblies 21, 22, 23, 24, 25 and 26, in effect, form a frame and this frame holds the wires 45, 46, 47, 48, 49 and 50 respectively in tension between the posts 33 and 39, the posts 34 and 40, the posts 35 and 41, the posts 36 and 42, the posts 37 and 43, and the posts 38 and 44. The wires 45, 46, 47, 48, 49 and 50 together hold the mass 18 suspended within the cavity 11 out of contact with the sides of the cavity 11 and the ends of the studs 19, inasmuch as the wires are connected to the mass 18 on all three axes and from all six directions.

The mass 18 moves within and relative to the housing 10 due to the reaction of the mass to an unbalanced force applied to and producing an acceleration of the housing 10, and thus increases and decreases the tension in the wires 45, 46, 47, 48, 49, and 50, depending on the direction of the force. A suitable material for the wires 45, 46, 47, 48, 49 and 50 is cold drawn tungsten. A wire of this material is free from local strain and is not subject to creeping under tension, and furthermore, the tension on such a wire may be brought nearly to its elastic limit without causing any perceptible creeping. The wire also is very thin and may, for example, have a diameter of .0007 inch.

Each of the wires 45, 46, 47, 48, 49 and 50 is kept in vibration at a natural frequency, particularly its fundamental frequency by means of a feedback amplifier 54. The FIG. 3 diagram illustrates an amplifier 54 for each of the wires 45 and 47, and the amplifier 54 in the right hand portion of this diagram is for the wire 47. This amplifier 54 is connected to an electrical bridge network 55 having resistors 56 and 57 connected at a junction 58 thereof to one end of a lead 59 from the amplifier 54. The resistors 56 and 57 constitute two of the four arms of the bridge network 55, and the other two arms are formed by the vibratory wire 47 and by a static wire 60 which preferably extends through the same wire retaining assembly in which the vibratory wire is located, so that the vibratory wire and the static wire remain at the same temperature. The vibratory wire 47 is electrically connected to the mass 18, and the mass 18 is electrically connected to the housing 10 by means of a flexible lead 61. The vibratory wire 47 and the resistor 56 have a junction 62; the resistor 57 and the static wire 60 have a junction 63; and the housing 10 is grounded at a point 64 which constitutes a junction between the vibratory wire 47 and the static wire 60. The two wire junctions 62 and 63 and also the lead 59 are connected to the amplifier 54 which is grounded at 65. The amplifier has two output leads 66 and 67.

The amplifier 54 may be of any suitable feedback type, such as of the type disclosed in detail in my co-pending application for "Dual String Force Transducer," Serial No. 660,009, filed May 17, 1957. An amplifier 54 and a bridge network 55 of the same construction and with the same connections as described for the wire 47 are used for the vibratory wire 45, and this amplifier 54 and bridge network 55 are shown for the wire 45 in the lefthand portion of the FIG. 3 diagram.

The two amplifiers 54 connected respectively to the vibratory wires 47 and 45 have their output leads 66 and 67 connected to a mixer 68 which is of a suitable type containing one or more non-linear elements so as to produce sum and difference output frequencies. This mixer is connected by output leads 69 and 70 with a low pass filter 71. The low pass filter may have any suitable conventional arrangement. The low pass filter has output terminals 72 and 73, and a frequency meter 74 of any suitable type is connected across the terminals 72 and 73.

A mixer 68, a low pass filter 71, and a frequency meter 74, together with two amplifiers 54 and two networks 55, are provided for each of the two other pairs of vibratory wires on both the Y axis and also the Z axis, these pairs being the wires 46 and 48 on the Y axis and the wires 49 and 50 on the Z axis. For the electrical assemblage for the Y axis, the vibratory wires 46 and 48 are simply substituted for the wires 45 and 47 in the FIG. 3 diagram; and for the Z axis assemblage, the vibratory wires 49 and 50 are simply substituted for the vibratory wires 45 and 47 in the FIG. 3 diagram.

In operation, assuming a certain acceleration given the accelerometer, the forces due to inertia of the mass 18 tend to move the mass in accordance with the acceleration. The flexible wires 45, 46, 47, 48, 49 and 50 hold the mass 18 properly positioned at substantially the center of the cavity 11, and the stops 19 limit the movement of the mass 18 within the cavity with increases and decreases of tension in the vibratory wires 45, 46, 47, 48, 49, and 50.

Assuming an acceleration given the accelerometer in one direction, such as toward the right as seen in FIG. 1 along the X axis, the mass 18 due to force of inertia tends to move toward the wire retaining assembly 21, decreasing the tension on the wire 45 and at the same time increasing the tension on the wire 47. This movement of the mass 18 also is effective on the other four vibratory wires 46, 48, 49 and 50, but the tension in these wires is increased equally. Likewise, when the mass 18 tends to move due to force of inertia in the opposite direction, the tension on the wire 45 is increased and the tension on the opposite wire 47 is decreased.

As the tension on the wires 45 and 47 increases or decreases, the natural frequency of vibration, particularly the fundamental frequency, of these wires respectively increases and decreases. Each of the wires 45 and 47 is positioned in the magnetic field between the poles 52 and 53 of the magnet 51 in its respective assembly 21 or 23, and the wires vibrate in a direction perpendicular to their axes at a natural frequency with a nearly sinusoidal motion, and they generate an alternating voltage therein having the same frequency. The mass 18 in changing the tension on the wires 45 and 47 with acceleration causes the frequency of vibration and the frequency of the resulting generated alternating voltage to change accordingly. Sustained vibration of the wires 45 and 47 in the illustrated system is obtained by employing the wires 45 and 47 as impedance elements in self-oscillating electrical circuits, including a bridge 55 and an amplifier 54 for each of the wires 45 and 47 to control the oscillatory frequency of these circuits.

It is to be noted that the mass 18, being connected between the two wires 45 and 47, acts to disconnect the two wires with respect to each other and acts to establish a null point in the transverse vibration of the wires 45 and 47, so that the vibratory frequencies of the wires on the two sides of the mass 18 are controlled by the net tension in the individual wires 45 and 47 obtained as a result of the inertia force of the mass 18 on the X axis.

Each of the bridge networks 55 constitutes a filter which is used in a feedback circuit of the respective amplifier 54 for each of the wires 45 and 47 to render the amplifier operable as an oscillator. Each network 55, one of whose arms contains the vibratory wire 45 or 47, constitutes a balanced bridge under static conditions, assuming no vibration in the wire 45 or 47. The upper resistors 56 and 57 are equal in value, and the static wire 60 has the same resistance as the vibratory wire 45 or 47, preferably the wire 60 being precisely like the vibratory wire 45 or 47, except that it is not positioned in a magnetic field.

As each network 55 is balanced when the wire 45 or 47 is not in motion, no alternating potential exists between the junctions 62 and 63 connected to the respective amplifier 54 when the vibratory wire 45 or 47 is still. When, however, each of the wires 45 and 47 vibrates in the magnetic field between its poles 52 and 53, it develops therein a counter-electromotive force in well-known manner, thus developing an effective dynamic impedance greater than its static impedance which unbalances the bridge network 55 and provides an alternating voltage of this frequency between the junctions 62 and 63 applied to the amplifier 54 connected thereto. The amplifier 54 for each of the wires 45 and 47 provides an output signal between its output leads 66 and 67 having the frequency of vibration of the respective wire 45 or 47, and a portion of the output signal of the amplifier 54 is applied between the lead 59 and the ground connection 65 for applying an alternating voltage of this frequency across the bridge network 55, between the junction 58 and the ground connection 64, for maintaining the respective wire 45 or 47 in vibration. The wires 45 and 47 each have a definite vibration frequency for each adjusted tension of the wire and insures the maintenance of this frequency after adjustment and the repetition of this frequency when the same adjustment is made again, and the amplifier 54 connected with the respective wire maintains it in vibration at a fundamental frequency depending on its tension and provides an electrical signal between its outlet leads 66 and 67 of this frequency.

Figure 3:
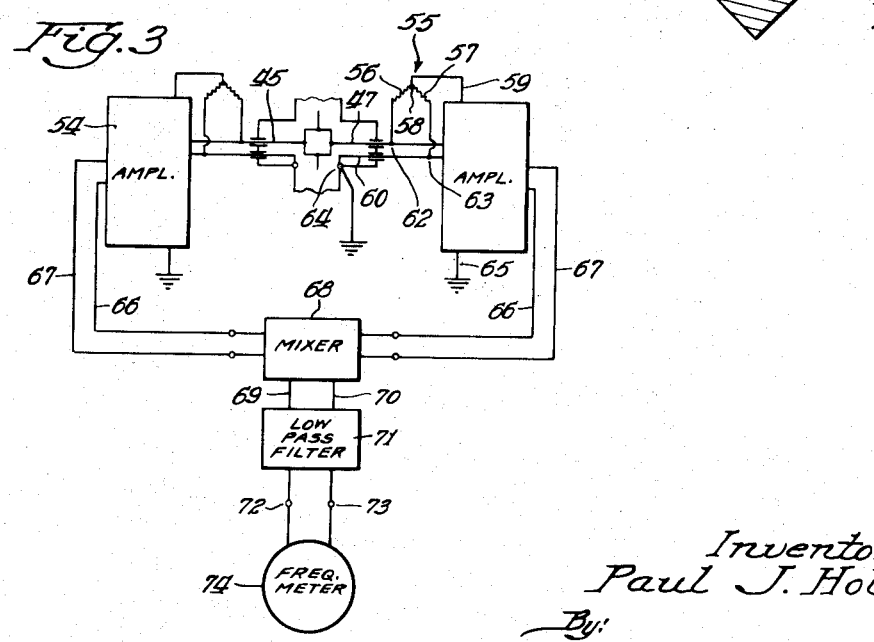
FIG. 3 is an electrical diagram showing an electrical system for use in connection with the accelerometer.

The outputs of the two amplifiers 54 driven respectively by the vibratory wires 45 and 47 are applied to the mixer 68 through the leads 66 and 67 as seen in FIG. 3. The mixer 68 applies on its output leads voltages having the sum and difference frequencies of $f_1-f_2$, $f_1+f_2$, or $2f_1 \pm f_2$ due to the functioning of the mixer 68 to heterodyne together the input frequencies from the amplifiers 54. The electrical energy between the leads 69 and 70 at these frequencies is applied to the low pass filter 71, so that the electrical energy at the output terminals 72 and 73 of the low pass filter is at only the beat frequency of $f_1-f_2$. The frequency meter 74 is connected to the terminals 72 and 73 and measures the beat frequency $f_1-f_2$.

The difference in frequency between the two wires 45 and 47, if they are identical in all respects including their length, may be found by computations to be quite closely as follows:

$$f_1-f_2=f_0\left[\sqrt{\frac{1+\Delta s}{s}}_{\text{(for one wire)}} - \sqrt{\frac{1+\Delta s}{s}}_{\text{(for the other wire)}}\right]$$

where $f_0$ is the frequency of each wire when the acceleration is zero, $\Delta s$ is the change in stress or tension (plus or minus) and proportional to the applied force on the mass 18 and $s$ is the initial stress or tension in the vibratory wire when the acceleration and applied force on the mass 18 is zero.

It may be seen that when the frequency of one wire 45 or 47 increases, due to increase in tension, and that of the other decreases due to decrease in tension, the number of cycles change in the difference in frequency between the two wires is essentially twice that of either wire and is twenty or more times more linear with respect to $\Delta s$ (proportional to applied force at mass 18) for all $\Delta s/s$ ratios up to about one-tenth ($\frac{1}{10}$). It may also be seen that the actual frequency of either wire is eliminated in obtaining the difference frequency and that the difference in frequency is zero when the externally applied force due to acceleration acting along the length of the wires 45 and 47 is zero, assuming that the wires 45 and 47 are identical and equal in length. Since $f_0$ and the quantity $s$ for each wire 45 or 47 are known quantities, $\Delta s$ which is the change in stress or wire tension may be obtained from the formula from the difference frequency of $f_1-f_2$; and since $\Delta s$ is proportional to the applied force on the mass 18, the value of this applied force may be obtained.

As has been previously mentioned, there is a FIG. 3 electrical system for each of the other two pairs of vibratory wires 46 and 48 and also 49 and 50. In one of these additional systems, the vibratory wire 46 would be substituted for the wire 45 and the vibratory wire 48 is substituted for the wire 47. In the other of these systems, the wire 49 is substituted for the wire 45 and the wire 50 is substituted for the wire 47. If the mass 18 is accelerated in the Y axis instead of the X axis, the acceleration may be measured by the frequency meter 74 in the electrical system for the wires 46 and 48; and if the acceleration is in the Z axis in lieu of the other two axes, the frequency meter 74 for the electrical system for the vibratory wires 49 and 50 may be utilized for measuring the acceleration on the Z axis.

In most cases, however, the acceleration is not strictly along any one of the three X—X, Y—Y, or Z—Z axes, but is rather at an angle with respect to all of them. In this case, the components of the acceleration force along the X, Y and Z axes can be determined from the frequency meter 74 for each of the axes; and with the X, Y and Z components being known, the direction and amplitude of the acceleration force can be determined. The electrical systems for each of the pairs of wires, namely, for those on the X, Y and Z axes, function substantially independently of each other so that the true component of the acceleration force may be obtained from the reading of the frequency meter 74 for each of the three axes; the frequency meter as hereinbefore mentioned, indicating directly the difference in the frequencies of vibration of the vibratory wires on each of the three axes.

The transducer is particularly accurate in indicating the true force of acceleration or the true components thereof, if the acceleration is not strictly on one of the X, Y, or Z axes, due to the fact that an incipient force when applied on the mass 18 at right angles to any one of the X, Y or Z axes of the transducer does not materially influence the $f_1-f_2$ quantity for this axis. An inspection of the above formula setting forth the relation between the quantity $f_1-f_2$, $f_0$, $\Delta s$ and $s$ reveals that when such a force at right angles to any of the longitudinal axes is applied, the change in tension, namely $\Delta s$ of the two wires along the axis, is nearly equal and is positive in sign for both wires; and the difference in frequency between the two wires on the particular axis being considered due to the inertia force of the mass 18 remains essentially unchanged by the action of the incipient force at right angles to the axis. Thus, the true magnitude of the acceleration force on the accelerometer may be accurately determined from any one of the frequency meters 74 assuming the force is directly along any one of the three X, Y or Z axes; and the true value and direction of the acceleration force may be accurately obtained using the three frequency meters 74, assuming that the acceleration is at angles to all three axes.

The accelerometer may, for example, be used in a missile and, in the event that the accelerometer in flight assumes different oriented positions with respect to absolute vertical, gravity could have a variable effect on the mass 18 thus variably affecting the tension of the various wires. In order to overcome this condition, the accelerometer is mounted on a stable platform which is maintained by suitable servo mechanisms in fixed position with respect to absolute vertical, such as in a platform position in which one of the three accelerometer axes is always on an obsolute vertical. In this case, the force of gravity acting on the mass 18 will not variably affect the tension of the wires to change the $f_1-f_2$ quantity for any of the axes from its true value while the missile is in flight.

I contemplate that the vibratory wires 45, 46, 47, 48, 49, and 50 may be purposely made unequal in length, density, cross-sectional area, moduli of elasticity, or combination thereof, to obtain, for example, a difference in frequency between the frequencies of vibration of the wires of any particular pair when the applied force and the inertia force due to acceleration are zero, in order to permit the sense and the magnitude of the force producing the acceleration to be determined by the value of change of the difference in frequency. I also contemplate, and it is within the scope of my invention, that the wires 45, 46, 47, 48, 49 and 50, instead of being circular in cross-section, may have various cross-sectional shapes, such, for example, as ribbonlike or polygonal, and I also contemplate that strings of non-conductive material coated with conductive material may be employed instead of metallic strings.

In the event the acceleration occurs in only one plane of the transducer, such as in the X—Y plane, perpendicular to the Z axis, in this case the electrical system for the vibratory wires 49 and 50 may be dispensed with, and in this case the wires 49 and 50 have the sole function of suspending the mass 18 in the cavity 11 and within the X—Y plane. In this case, the transducer is substantially a two axis transducer measuring acceleration force just in the X—Y plane. In the case of such a two axis accelerometer, two different frequency signals $f_1-f_2$ are obtained from two frequency meters 74, one responsive to the component of inertia force in the X direction and the other to the component of inertia force in the Y direction.

I also contemplate, in the three axis transducer shown in FIGS. 1 and 2 or in the two axis transducer in which one of the FIG. 3 electrical systems is eliminated, that other suitable force applying means may be used in lieu of the mass 18. The three axis transducer utilizing the three FIG. 3 electrical systems would measure the magnitude and direction of the force in the three axes, and the two axis transducer would be effective to measure the magnitude of a force and its direction in a single plane.

The improved transducers disclosed herein advantageously employ a plurality of pairs of vibrating wires under tension, as distinguished from a single pair, as sensing elements in which an externally applied force results in a decrease of tension of some of the wires and an increase in tension of the other wires, resulting in alternating electrical signals of frequencies that are direct measures of the components of the applied force. In view of the fact that pairs of wires in lieu of single wires are used, greater accuracy is obtained, particularly since the frequency output signal from each of the pairs of vibrating wires is substantially unaffected by forces acting at right angles to the wires' axis.

I wish it to be understood that my invention is not to be limited to the specific constructions and arrangements shown and described, except only in so far as the claims may be so limited, as it will be understood to those skilled in the art that changes may be made without departing from the principles of the invention.

I claim:

1. In a force measuring system, the combination of a plurality of pairs of stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, the strings of each of said pairs having different natural frequencies of vibration so that the frequency of vibration of one of said strings is always more than the frequency of vibration of the other of said strings throughout a predetermined range of variations in force on said force responsive element, means for vibrating said strings at their natural frequencies of vibration, and means for indicating the difference in the frequencies of vibration of the strings of each pair as an indication of both the magnitude and direction of the force components acting along the pairs of strings for determination of the magnitude and direction of the force acting on said force responsive element.

2. In a force measuring system, the combination of a plurality of pairs of stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, the strings of each of said pairs having different physical characteristics so that the natural frequency of vibration of one of said strings is always more than the natural frequency of vibration of the other of said strings throughout a predetermined range of variations in force on said force responsive element, means for vibrating said strings at their natural frequencies of vibration, and means for indicating the difference in the frequencies of vibration of the strings of each pair as an indication of both the magnitude and direction of the force components acting along the pairs of strings for determination of the magnitude and direction of the force acting on said force responsive element.

3. In a force measuring system, the combination of a plurality of pairs of stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string paid due to force acting on said element, said element increases the tension in one of said strings of the pair while decreasing the tension in the other of said strings of the pair, the strings of each of said pairs being of different lengths so that the natural frequency of vibration of one of said strings is always more than the natural frequency of vibration of the other of said strings throughout a predetermined range of variations in force on said force responsive element, means for vibrating said strings at their natural frequencies of vibration, and means for indicating the difference in the frequencies of vibration of the strings of each pair as an indication of both the magnitude and direction of the force components acting along the pairs of strings for determination of the magnitude and direction of the force acting on said force responsive element.

4. In a force measuring system, the combination of a plurality of pairs of stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, the strings of each of said pairs having different moduli of elasticity so that the natural frequency of vibration of one of said strings is always more than the natural frequency of vibration of the other of said strings throughout a predetermined range of variations in force on said force responsive element, means for vibrating said strings at their natural frequencies of vibration, and means for indicating the difference in the frequencies of vibration of the strings of each pair as an indication of both the magnitude and direction of the force components acting along the pairs of strings for determination of the magnitude and direction of the force acting on said force responsive element.

5. In a force measuring system, the combination of a plurality of pairs of stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, means for vibrating said strings at their natural frequencies of vibration including means for causing the strings of each pair to vibrate in different planes to minimize mechanical coupling therebetween, and means for indicating the difference in the frequencies of vibration of the strings of each pair as an indication of both the magnitude and direction of the force components acting along the pairs of strings for determination of the magnitude and direction of the force acting on said force responsive element.

6. In a force measuring system, the combination of a plurality of pairs of stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, means for vibrating said strings at their natural frequencies of vibration including means for causing the strings of each pair to vibrate in different planes disposed at approximately 90° to minimize mechanical coupling therebetween, and means for indicating the difference in the frequencies of vibration of the strings of each pair as an indication of both the magnitude and direction of the force components acting along the pairs of strings for determination of the magnitude and direction of the force acting on said force responsive element.

7. In a force measuring system, the combination of a plurality of pairs of electrically conductive stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, means for vibrating said strings at their natural frequencies of vibration including means affording magnetic flux flow normal to the length of said strings, said magnetic flux means being so disposed as to cause the strings of each pair to vibrate in planes disposed at approximately 90° to minimize mechanical coupling therebetween, and means for indicating the difference in the frequencies of vibration of the strings of each pair as an indication of both the magnitude and direction of the force components acting along the pairs of strings for determination of the magnitude and direction of the force acting on said force responsive element.

8. In a force measuring system, the combination of a plurality of pairs of electrically conductive stretched strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, means for vibrating said strings at their natural frequencies of vibration including means affording magnetic flux flow normal to the length of said strings and individual electrical means each of which comprises a separate one of said strings as a tuned electrical element, said magnetic flux means for causing the strings of each pair to vibrate in different planes to minimize mechanical coupling therebetween, and means for indicating the difference in the frequencies of vibration of the strings of each pair as an indication of both the magnitude and direction of the force components acting along the pairs of strings for determination of the magnitude and direction of the force acting on said force responsive element.

9. In a force measuring system, the combination of a plurality of pairs of stretched electrically conductive non-magnetic strings, the strings of each pair being coaxially disposed and the axis of said string pairs being at angles to each other, a force responsive element connected to each of said strings and joining the two strings of each of said pairs so that as said element is afforded movement, at least a component of which is along the axis of the string pair due to force acting on said element, said element increases the tension in one of said strings of the pair while decreasing the tension in the other of said strings of the pair, means for vibrating said strings at their natural frequencies of vibration including individual magnetic means affording magnetic flux flow normal to the length of said strings and individual electrical means comprising a resistance bridge having at least one electrical resistance leg and including as another leg one of said strings as a tuned electrical element for comparison with said electrical resistance leg, said magnetic means being angularly disposed to cause the flux flow at the strings of each pair to be offset by approximately 90° to cause the strings of each pair to vibrate in planes disposed at approximately 90° to minimize mechanical coupling therebetween, and means for indicating the difference in the frequencies of vibration of the strings of each pair as an indication of both the magnitude and direction of the force components acting along the pairs of strings for determination of the magnitude and direction of the force acting on said force responsive element.

(References on following page)

References Cited in the file of this patent

UNITED STATES PATENTS

| | | |
|---|---|---|
| 1,995,305 | Hayes | Mar. 26, 1935 |
| 2,377,212 | Cottrell | May 29, 1945 |
| 2,689,943 | Rieber | Sept. 21, 1954 |
| 2,725,492 | Allan | Nov. 29, 1955 |

FOREIGN PATENTS

| | | |
|---|---|---|
| 729,894 | Germany | Dec. 19, 1942 |